United States Patent
Watanabe et al.

[11] Patent Number: 6,140,788
[45] Date of Patent: Oct. 31, 2000

[54] METHOD AND SYSTEM FOR CONTROLLING ROBOT

[75] Inventors: Atsushi Watanabe, Minamitsuru-gun; Tetsuaki Kato, Hadano; Yukinobu Tsuchida, Oshino-mura, all of Japan

[73] Assignee: Fanuc Ltd., Yamanashi, Japan

[21] Appl. No.: 09/142,620

[22] PCT Filed: Jan. 27, 1998

[86] PCT No.: PCT/JP98/00314

§ 371 Date: Sep. 10, 1998

§ 102(e) Date: Sep. 10, 1998

[87] PCT Pub. No.: WO98/33100

PCT Pub. Date: Jul. 30, 1998

[30] Foreign Application Priority Data

Jan. 27, 1997 [JP] Japan ........................... 9-25715

[51] Int. Cl.[7] .................. G05B 19/408; G05B 19/18
[52] U.S. Cl. ..................... 318/568.22; 318/568.1; 318/568.18; 901/23
[58] Field of Search ................... 318/560–696; 395/80–99; 901/13, 18, 19, 23; 414/730, 732

[56] References Cited

U.S. PATENT DOCUMENTS

| | | | |
|---|---|---|---|
| 4,146,924 | 3/1979 | Birk et al. | 364/513 |
| 4,621,332 | 11/1986 | Sugimoto et al. | 364/513 |
| 4,715,773 | 12/1987 | Parker et al. | 414/730 |
| 4,773,025 | 9/1988 | Penkar et al. | 364/513 |
| 4,807,153 | 2/1989 | Onaga et al. | 364/513 |
| 4,874,997 | 10/1989 | Daggett et al. | 318/568.1 |
| 5,056,038 | 10/1991 | Kuno et al. | 364/513 |
| 5,742,138 | 4/1998 | Kato et al. | 318/568.18 |
| 5,770,936 | 6/1998 | Hirai et al. | 318/538 |

FOREIGN PATENT DOCUMENTS

| | | |
|---|---|---|
| 61-265289 | 11/1986 | Japan . |
| 61-265602 | 11/1986 | Japan . |
| 63-139678 | 11/1988 | Japan . |
| 64-44510 | 2/1989 | Japan . |
| 1-255105 | 10/1989 | Japan . |
| 4-310104 | 2/1992 | Japan . |
| 5-123987 | 5/1993 | Japan . |
| 6-250728 | 9/1994 | Japan . |
| 8-71969 | 3/1996 | Japan . |

*Primary Examiner*—Paul Ip
*Attorney, Agent, or Firm*—Staas & Halsey LLP

[57] ABSTRACT

A robot which holds a workpiece (W) to be loaded with chuck (CH) moves on a programmed path from a tool center point to a point Q in response to a command. When a force sensor detects the contact between the distal end face of the workpiece (W) and a workpiece fixing surface (H), a loop gain of a servo control system is changed into a lower value. In consequence, the attitude of the workpiece (W) is corrected by means of a reaction force received from the workpiece fixing surface (H) and reaction forces from chucking members (CH1 to CH4), whereupon chucking is completed.

6 Claims, 7 Drawing Sheets

FIG. 4

```
////////////SETUP/SOFT-FLOATING FOR INDIVIDUAL AXES ////////////

[  0 3  ]   TO BE SET

LIST OF CONDITIONS

AXIS NO.      1       2       3       4       5       6

# 0 1        10%     10%     30%     20%     10%     10%
        # 0 2        10%     10%     30%     20%     20%     20%
        # 0 3        10%     20%     30%     10%     10%     10%
        # 0 4        10%     10%     30%     20%     10%     10%
        # 0 5        10%     20%     30%     20%     20%     10%

. . . . . . . . . . . . . . . . . . . . . . . . . .

. . . . . . . . . . . . . . . . . . . . . . . . . .
```

METHOD AND SYSTEM FOR CONTROLLING ROBOT

FIELD OF THE INVENTION

The present invention relates to a control method for an industrial robot, in which the robot is enabled to perform proper operation when it touches an external object, and a control system for carrying out the control method.

DESCRIPTION OF THE RELATED ART

In the most popular cases, control of an industrial robot (hereinafter referred to simply as "robot") is based on a system in which the respective positions of motors for individual axes of the robot are controlled by means of a servo control system. Referring now to the block diagram of FIG. 1, this servo control system will be described.

The servo control system shown in FIG. 1 is a conventional one that has a position control loop and a speed control loop, including a term 1 for a position loop gain Kp, term 2 for a speed loop gain Kv, term 3 for a torque constant Kt, term 4 for an inertia J, and transfer function 5 with which an actual motor position q is obtained by integrating an actual motor speed v. Among these terms, the term 3 for the torque constant Kt and the term 4 for the inertia J constitute a transfer function term for the motor M. Symbol s represents a Laplace operator.

A position deviation e is computed from a move command r generated in a robot controller (not shown in FIG. 1) and the motor position q, and a speed command vc is outputted by multiplying the position deviation e by the position loop gain Kp. Further, a speed deviation ev is computed from the speed command vc and the actual motor speed, and a torque command tc is outputted by multiplying the speed deviation ev by the speed loop gain Kv. A driving current corresponding to the torque command tc is supplied to the motor. For the speed loop control, proportional-plus-integral control or integral-plus-proportional control may be used in place of proportional control, in some cases.

Conventionally, in this robot control, high rigidity (loop gain) is given to the servo control system to effect accurate positioning. In order to prevent breakage when the robot touches a peripheral object, however, the robot operation is made flexible by lowering the loop gain of the servo control system below a normal value for a section in which contact or collision is possible. This method is referred to as "floating based on software" or "soft-floating." Changeover to soft-floating control in response to a command from a CPU of the robot controller is referred to as "effectuation of a soft-floating function."

According to another known method to cope with the contact between the robot and an external object, moreover, danger is avoided by detecting contact by means of the outputs of various sensors (force sensor, proximity sensor, visual sensor, etc.) or a disturbance observer based on software and effecting an emergency stop.

In the case where the former technique (soft-floating) is applied for coping with the contact between the robot and the external object, however, it is necessary previously to teach in a program a part (section) in which the contact occurs. Accordingly, the soft-floating control is not carried out outside the taught section, so that contact may possibly be made in an unexpected section, thus resulting in breakage.

In the case where the latter technique (emergency stop after detection of contact) is adopted, on the other hand, no such control is effected as to reduce the rigidity of the servo control system immediately. Although the emergency stop is effected after detecting the contact by utilizing the various sensors or the disturbance observer, therefore, the robot is urged to move for a short distance along a taught path, with the loop gain of the servo control system kept high, thus inevitably interfering with the external object. Possibly, therefore, the peripheral object, gripped workpiece, hand, etc. may be damaged.

Whichever method we choose to cope with the contact, it is difficult to avoid danger unless the speed is sharply lowered for sections in which contact is supposed to occur. If the robot operation is stopped with every contact detection, moreover, the operating efficiency is lowered.

SUMMARY OF THE INVENTION

An object of the present invention is to provide a control method capable of avoiding the occurrence of breakage immediately after detection of contact without the necessity of previously teaching in a program a section in which contact may occur. Another object of the present invention is to provide a control method capable of correcting the position and attitude of a robot by utilizing an external force that acts so as to correct the position and attitude of the robot when the contact is made, if such an external force exists, without suspending the robot operation.

In order to achieve the above objects, a robot control method according to the present invention comprises: detecting the contact between a robot or an object supported on the robot and an external object during operation for the movement of the robot, the individual axes of which are driven by means of servomotors controlled by a control system including a position control loop and a speed control loop; and downwardly adjusting the respective gains of the position control loop and speed control loop when the contact is detected.

Further, a robot control system according to the present invention comprises: a robot controller for controlling a robot; contact detecting means for detecting the contact between the robot or an object supported on the robot and an external object, the means being connected to or provided in the robot controller; and gain modifying means for modifying a loop gain of the robot in accordance with an output from the contact detecting means.

Preferably, moreover, the robot controller is further connected with manual input means with a display screen for setting the value of the loop gain to be modified by means of the gain modifying means at a desired value or for selecting an optimum menu among some prepared menus.

According to the present invention, the occurrence of breakdown can be avoided immediately after contact detection without previously teaching in a program a section in which contact may occur. If there is an external force that acts so as to correct the position and attitude of the robot when the contact is made, the position and attitude of the robot can be corrected by utilizing the external force without suspending the robot operation. In consequence, the operation using the robot can be improved in safety and efficiency.

BRIEF DESCRIPTION OF THE DRAWINGS

FIG. 4 is a diagram showing a screen for setting conditions (softness of individual axes) for the effectuation of a soft-floating function;

DESCRIPTION OF THE PREFERRED EMBODIMENTS

The present invention is characterized in that contact between a robot and an external object is detected by means of a sensor (force sensor, proximity sensor, or visual sensor) connected to a robot controller or contact detecting means, such as a disturbance observer based on software, and a soft-floating function is effectuated correspondingly.

If the robot, during the effectuation of the soft-floating function, is subjected to an external force such that it is pressed or drawn in, the robot passively moves in the direction to cancel the external force. The point of completion of this passive movement can be expected to agree with the desired position and attitude for actual operation.

Figure 1:
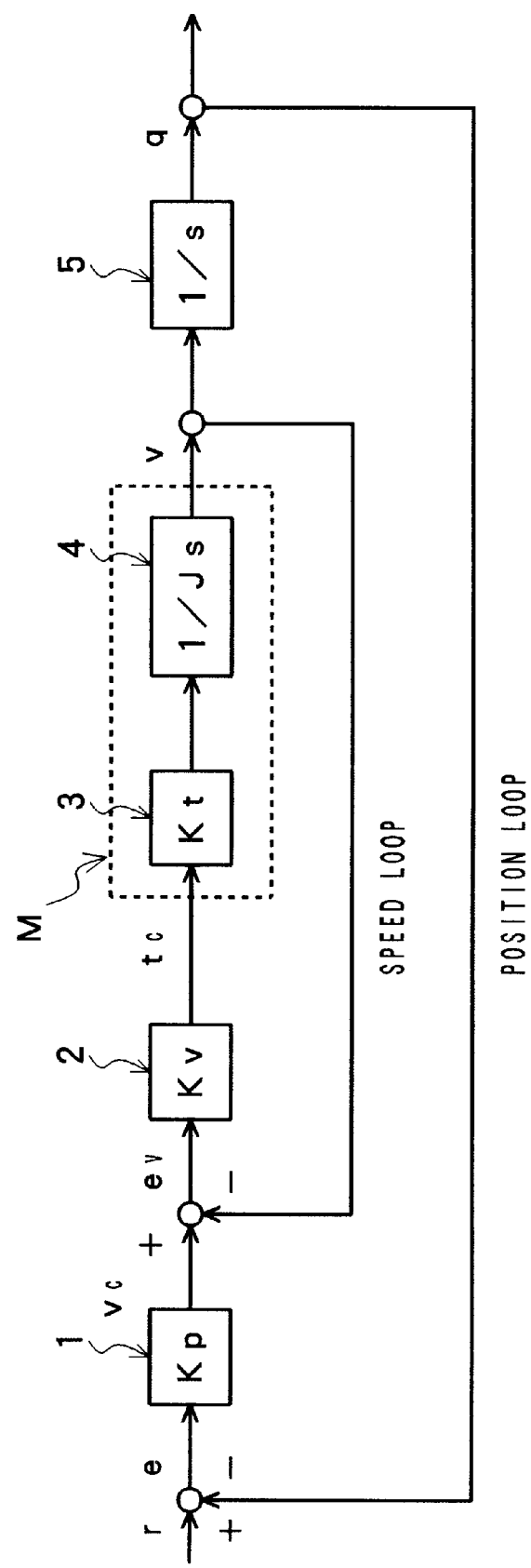
FIG. 1 is a block diagram for illustrating the basic configuration of a servo control system including a position control loop and a speed control loop.
Figure 2:
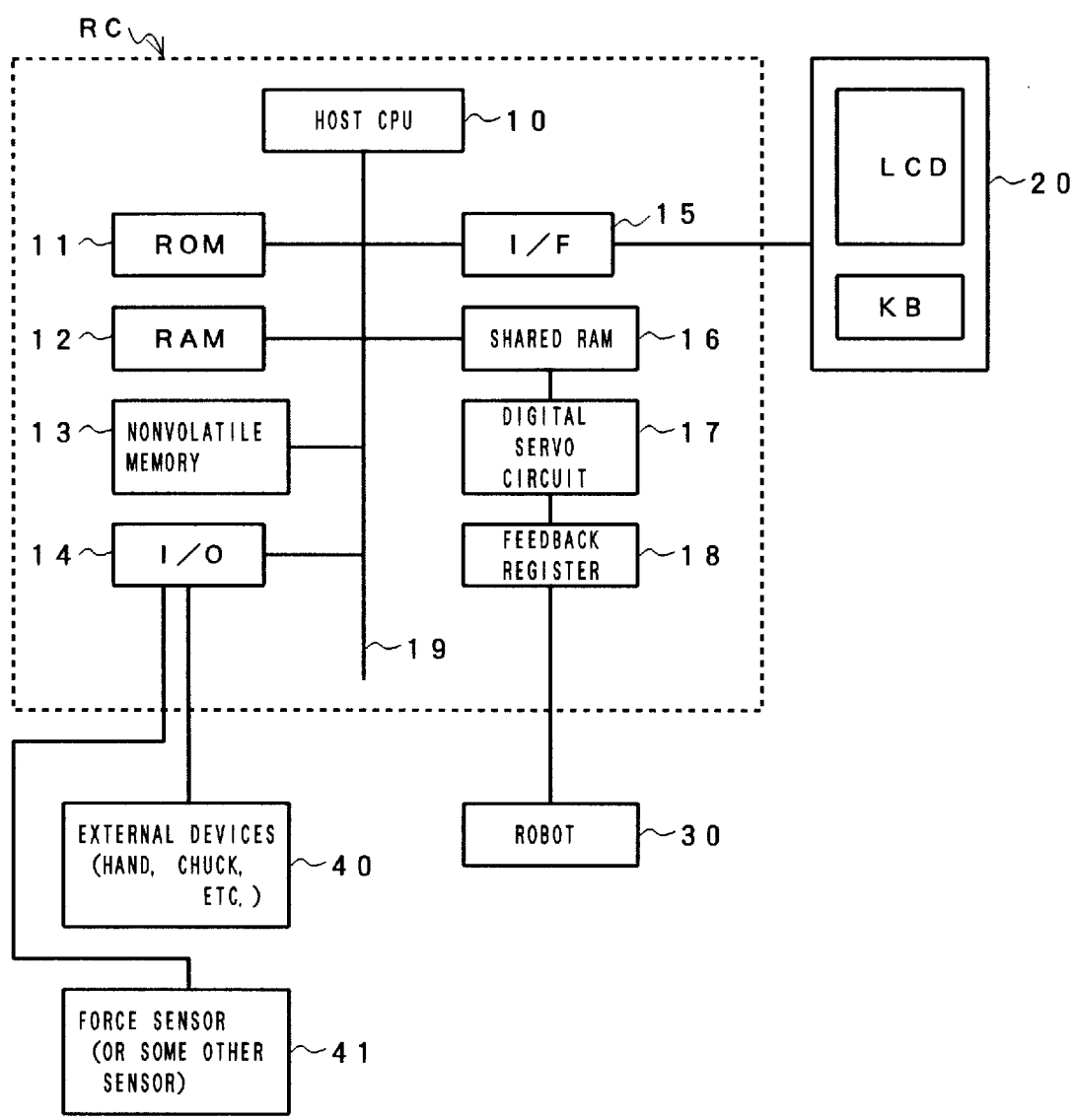
FIG. 2 is a block diagram showing the principal part of an outline of a robot controller and peripheral devices used in carrying out the present invention.

Referring first to the block diagram of FIG. 2 showing the principal part, the robot controller used for robot control according to the present invention will be described.

The whole system of a robot controller RC is controlled by means of a host CPU 10. The host CPU 10 is connected, by means of a bus 19, with a ROM 11, RAM 12, nonvolatile memory 13, input-output device (I/O) 14, interface (I/F) 15, and shared RAM 16. Further, the shared RAM 16 is connected with a digital servo circuit 17, and the digital servo circuit 17 is connected with a feedback register 18.

The ROM 11 is loaded with various system programs. The RAM 12 is used for the temporary storage of data from the host CPU 10. The nonvolatile memory 13 is loaded with various programs related to the contents of operation of a robot 30 and external devices 40 and relevant set values, etc. The input-output device (I/O) 14 serves as an interface leading to the external devices 40. The interface (I/F) 15 is connected with an instruction control panel 20.

The shared RAM 16 serves to deliver move commands and control commands from the host CPU 10 to a processor of the digital servo circuit 17 or, otherwise, to deliver various signals from the processor of the digital servo circuit 17 to the host CPU 10. The digital servo circuit 17, which is comprised of processor and memories such as a ROM, RAM, etc., executes servo control (software servo control). The feedback register 18 is loaded with position feedback values, speed feedback values, current feedback values, etc. for servomotors for individual axes.

In the robot controller of FIG. 2, the host CPU 10, shared RAM 16, and digital servo circuit 17 are elements that are concerned directly in soft-floating control.

The instruction control panel 20, which is provided with a liquid crystal display LCD and a keyboard KB, can perform invocation of a screen for setting the softness of a soft-floating servo in the manner mentioned later, as well as a program play-back operation command, jog-feed command, entry and modification of program data, and entry and modification of relevant set values.

A sensor 41, such as a force sensor or proximity sensor, or a disturbance observer based on software is used to detect contact between the robot 30 or an object supported by the robot 30 and another object. When utilizing a sensor, the sensor 41 (including a sensor control unit) is connected to the input-output device 14. The contact may be detected by using a visual sensor in place of the force sensor or proximity sensor. In this case, the input-output device 14 may be connected separately with a well-known image processing system that is provided with a camera, an interface, an image processor, a frame memory, etc., or the robot controller RC may be designed to have the image processing system built-in. Although the contact between the robot 30 or an object supported by the robot 30 and another object can be detected by various means, as described above, the contact is preferably detected by means of the force sensor 41 that is attached to an arm of the robot according to the present embodiment.

Referring to FIGS. 3A to 7C, a case will be described in which a control method according to the present invention is executed by using the system shown in FIG. 2 above.
(1. Contents of Work and Layout)

Figure 3A:
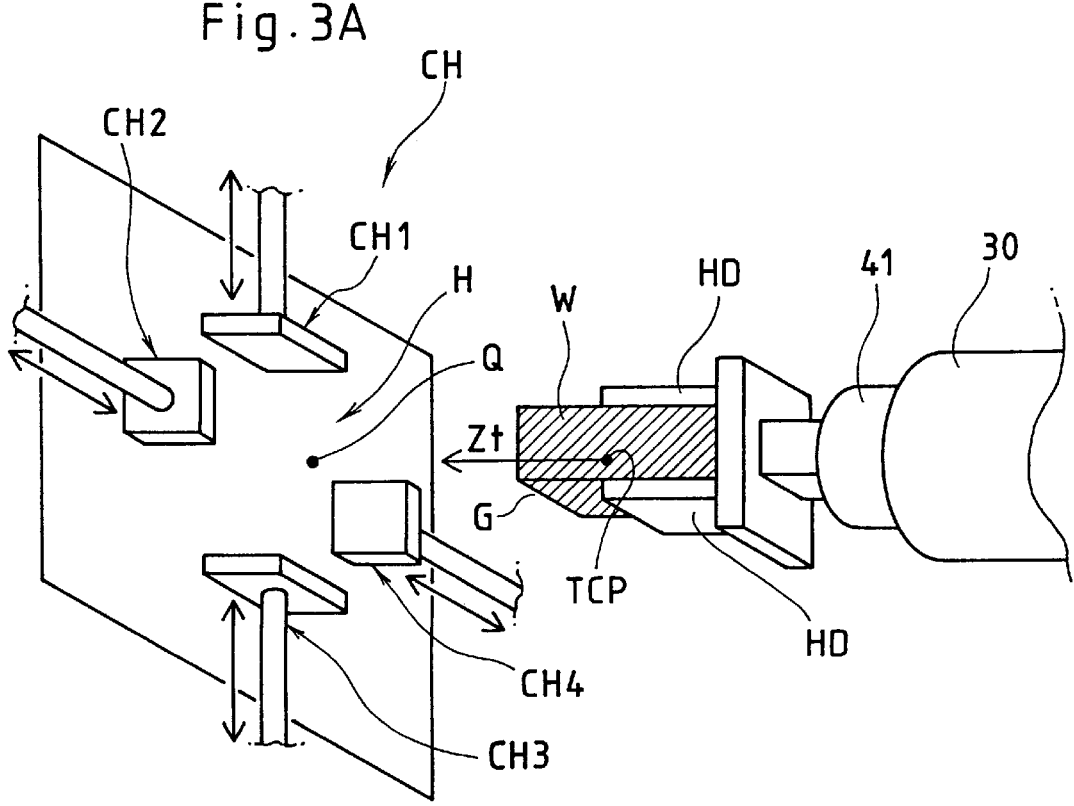
FIG. 3A is a view for illustrating the relative positions of a robot hand and a chuck, and shows the case where the present invention is applied to loading of the chuck with a workpiece by means of the robot hand.

The following is a description of a case in which the control according to the present invention is applied to the loading of a chuck with a workpiece by means of a robot hand, as shown in FIG. 3A. Thus, the external devices 40 include a hand (switchgear) and a chuck (switchgear).

As shown in FIG. 3A, a chuck CH used in a workpiece holding section of a machine tool (not shown) includes four chucking members CH1 to CH4. These chucking members CH1 to CH4, which are lined up on a workpiece fixing surface H of the chuck CH, slide on the workpiece fixing surface H to come close to one another (i.e., to be closed) or to go away from one another (i.e., to be opened).

Figure 3C:
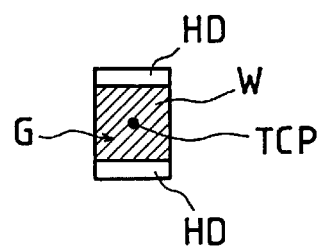
FIG. 3C is a sectional view showing a state in which the workpiece of FIG. 3A is supported by the chuck of FIG. 3A.

A workpiece W, with which the chuck CH is to be loaded, has a square cross section, as shown in FIG. 3C, and is held by means of a hand HD that is attached to the distal end portion of an arm of the robot 30 by means of the force sensor 41. A tool center point (TCP) is set in the center of the distal end portion of the hand HD. As shown in FIG. 3A, a Z-axis Zt of a tool coordinate system extends in the axial direction of the hand HD.

A taught path is supposed to be a path that extends from the present TCP shown in FIG. 3A to a point (position/attitude) Q near the center of a space region that is surrounded by the chucking members CH1 to CH4. The instruction point Q is taught so that the workpiece W slightly cuts into the workpiece fixing surface H of the chuck CH. However, high-accuracy instruction is not indispensable (for which the reason will be described later).

Figure 3B:
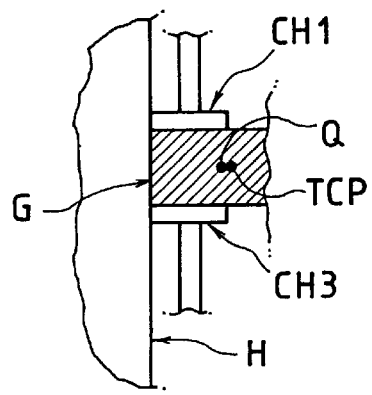
FIG. 3B is a sectional view showing a state in which the chuck of FIG. 3A is fully loaded with the workpiece of FIG. 3A.

As the robot is moved by program play-back operation, the workpiece W is transported toward the instruction point Q, and its four side faces are held between the chucking members CH1 to CH4 in their closing operation. When the loading is completed correctly, as shown in FIG. 3B, a distal end face G of the workpiece W is in contact with the workpiece fixing surface H, and the four side faces of the workpiece W are held between the individual chucking members CH1 to CH4 leaving no gaps. It is to be noted that the TCP of the robot in this state is located a little nearer to the distal end of the robot arm than the instruction point Q that is set on the chuck CH.

(2. Preparations)

1. A series of sequence operations is taught including the movement of the workpiece W held in the hand HD to the instruction point Q, closing of the chuck, opening of the hand, etc. The contents of the taught processing will be described later with reference to the flowchart of FIG. 5. The way of selecting the instruction point Q has already been described with reference to FIG. 3B. The speed of instruction for the movement toward the instruction point Q need not be lowered in particular.

2. The keyboard KB of the instruction control panel 20 is operated to invoke a "SERVO SOFTNESS SETTING SCREEN," such as the one shown in FIG. 4, onto the LCD, and conditions (softness of the individual axes) for the effectuation of the soft-floating function are set.

In the "SERVO SOFTNESS SETTING SCREEN" shown in FIG. 4, one condition for the effectuation of the soft-floating function is selected from among conditions #01, #02 . . . that are provided in advance. Numerical values given in % for the individual axes (first to sixth axes of the robot) with respect to the individual conditions represent ratios to a position loop gain $K_{p\text{-}normal}$ and a speed loop gain $K_{v\text{-}normal}$ for a normal mode. These values are settled in consideration of the necessary softness for the individual directions (e.g., directions of X-, Y-, and Z-axes on a base coordinate system) in the space. In the case shown in FIG. 4, the condition #03 is selected by screen inputting.

The conditions for the softness of the servo are not limited to the system in which they are assigned by the ratios (%) for the individual axes, as shown in FIG. 4. Alternatively, for example, the values of a position loop gain $K_{p\text{-}touch}$ and a speed loop gain $K_{v\text{-}touch}$ at the time of soft-floating function effectuation (when contact is detected) may be set for the individual axes. Naturally, these values $K_{p\text{-}touch}$ and $K_{v\text{-}touch}$ are smaller than the values of the position loop gain $K_{p\text{-}normal}$ and the speed loop gain $K_{v\text{-}normal}$ for the normal mode (in which soft-floating function is not effectuated).

(3. Contents of Processing and Operation)

Referring now to the flowchart of FIG. 5, there will be described an outline of processing by the host CPU 10 of the robot controller that is executed until chucking by means of the chuck CH is completed after operation for movement from the state shown in FIG. 3 toward the instruction point Q is started.

Figure 5:
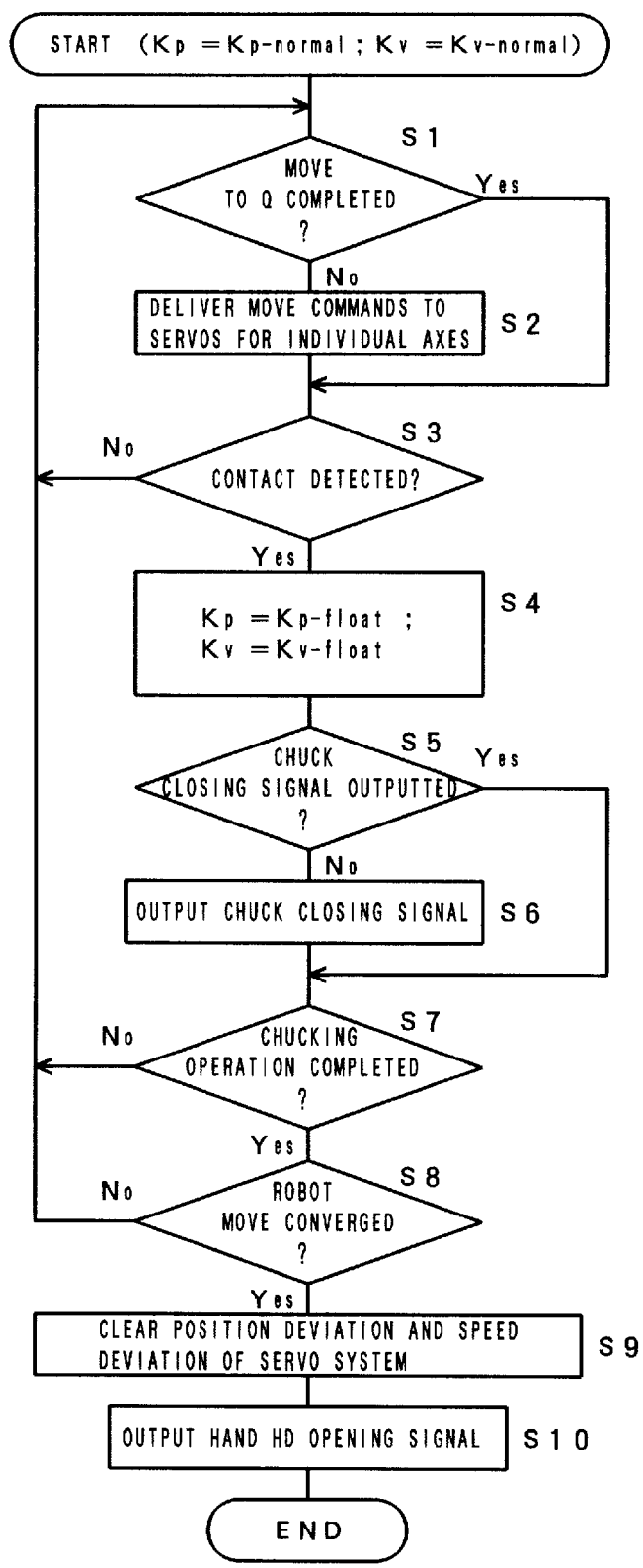
FIG. 5 is a flowchart for illustrating an outline of processing carried out by the robot controller of FIG. 2, in the case where the present invention is applied to loading of the chuck with the workpiece by means of the robot hand.

The processing of FIG. 5 is started when the host CPU 10 reads a statement related to an instruction for the movement to the instruction point Q. Thereafter, this processing is repeated with every interpolation cycle. The position loop gain and the speed loop gain for the individual axes at the start of the processing for movement are at their normal-state values, $K_{p\text{-}normal}$ and $K_{v\text{-}normal}$, respectively.

When the CPU 10 first determines that the processing for the movement to the instruction point Q is not completed (Step S1), it forms a track plan in accordance with read program data and delivers move commands to servos for the individual axes (Step S2).

Immediately after the move commands are outputted, an up-to-date output from the force sensor 41 is checked to see if the workpiece W held by the hand HD of the robot 30 is in contact with an external object (e.g., part of the chuck CH or some other obstacle) (Step S3). During the processing in this case, however, no obstacle is supposed to exist on the path (programmed path) that extends to the point Q near the center of the space region surrounded by the chucking members CH1 to CH4. Accordingly, an output that is indicative of the contact between the workpiece W and the external object is obtained from the force sensor 41 (the determination in Step S3 becomes YES) only when one region (corner portion that is continuous with the distal end face G, in particular) of the workpiece W moving along the programmed path abuts against the workpiece fixing surface H of the chuck CH, as shown in FIG. 6.

Until the one region of the workpiece W abuts against the workpiece fixing surface H of the chuck CH, therefore, the processes of Step S1, Step S2, Step S3, and Step S1 are repeated without modifying the values of the position loop gain and the speed loop gain (i.e., with the values $K_{p\text{-}normal}$ and $K_{v\text{-}normal}$ at the start of processing maintained).

As the robot continues to move, a part of the workpiece W comes into contact with the workpiece fixing surface H of the chuck CH before long. FIG. 6 shows an example of the attitude of the workpiece W in contact with the workpiece fixing surface H of the chuck CH. Further, FIGS. 7A, 7B and 7C show an example of the motion of the robot (i.e., motion of the workpiece W held by the distal end of the arm of the robot) after the workpiece fixing surface H of the chuck CH is touched by the part of the workpiece W. As shown in FIGS. 6, 7A and 7B, the distal end face G of the workpiece W is supposed to be inclined at an angle to the workpiece fixing surface H (see FIG. 6) and also to the respective chuck surfaces of the chucking members CH1 to CH4 (see FIG. 7B), due to factors such as variation of the attitude of the gripped workpiece W and the like. FIGS. 6 and 7A show the way one (GC) of the four corner portions of the workpiece W that are continuous with the distal end face G thereof (or one of the four edges that are continuous with the distal end face G) first comes into contact with the workpiece fixing surface H of the chuck CH.

Figure 6:
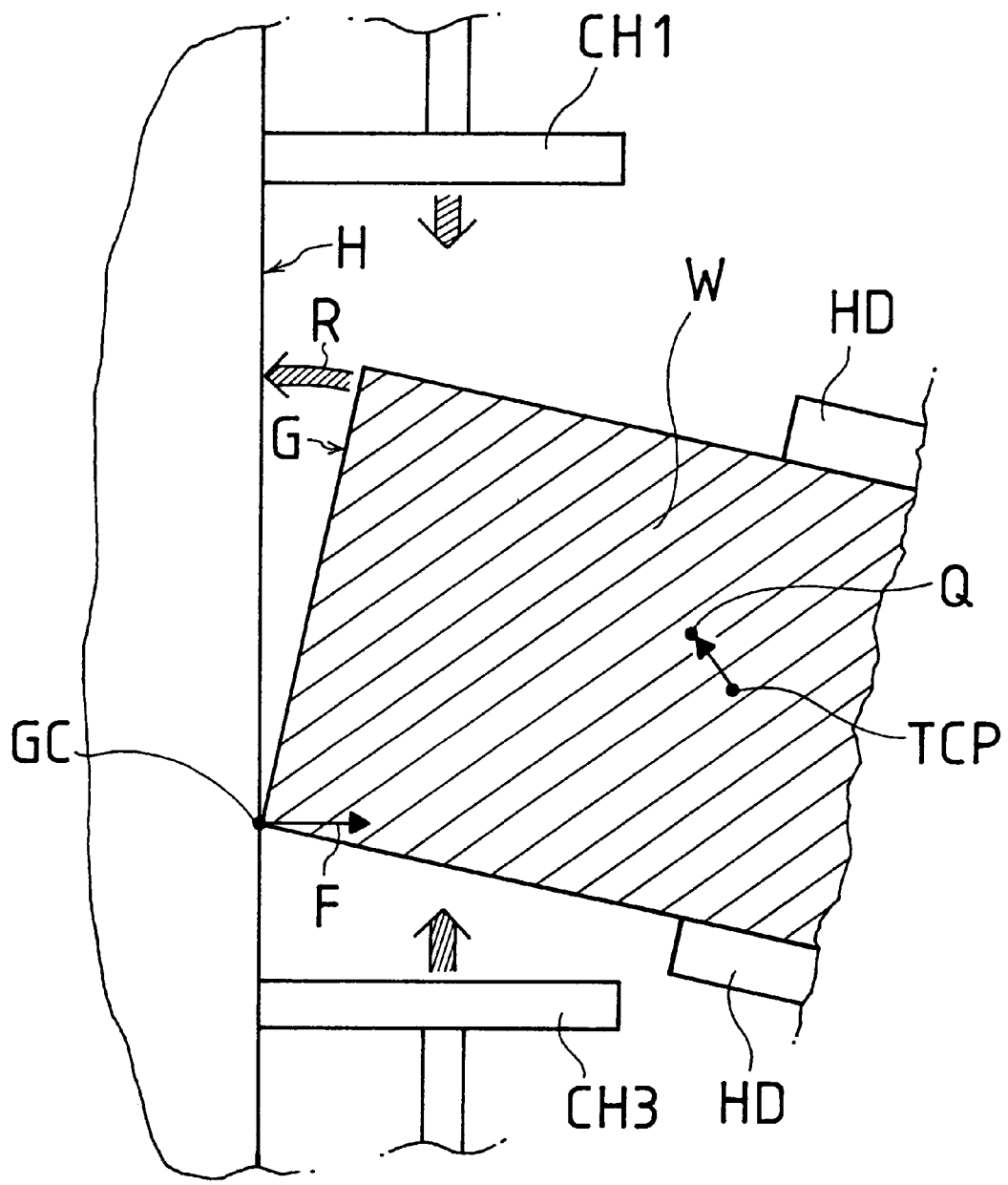
FIG. 6 is a sectional view showing a state in which a region of the workpiece abuts against a workpiece fixing surface of the chuck during the processing of FIG. 5.
Figure 7A:
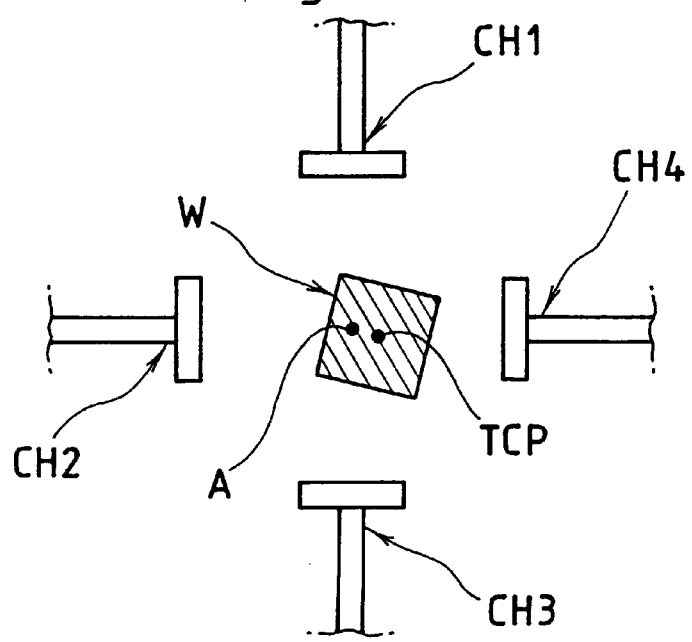
FIG. 7A is a view showing a state in which the workpiece is in contact with the workpiece fixing surface of the chuck and chucking members are located in their retreated positions without starting closing motion, during the processing of FIG. 5.
Figure 7B:
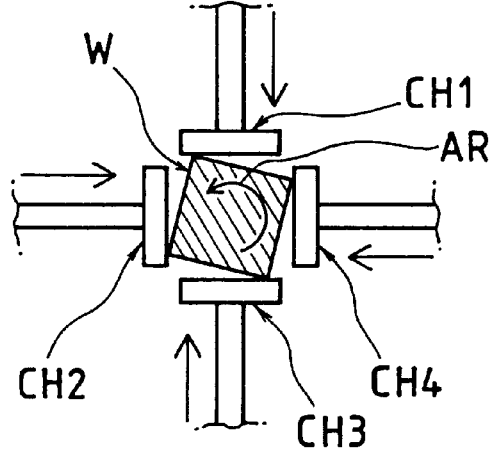
FIG. 7B is a view showing a state following the state of FIG. 7A, in which the corner portions or edges of the workpiece continuous with the individual side faces thereof are individually in contact with all of the four chucking members.
Figure 7C:
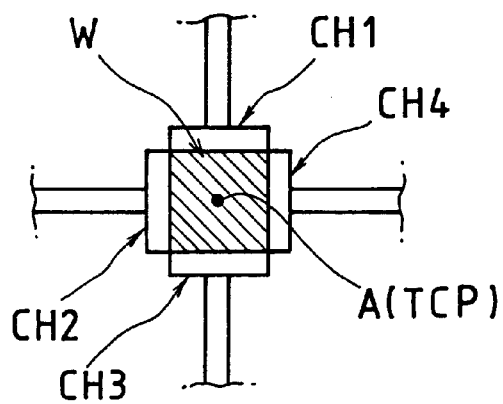
FIG. 7C is a view showing a state in which chucking of the workpiece by means of the chucking members is completed after the state of FIG. 7B.

When the workpiece W is in the state shown in FIGS. 6 and 7A, the closing operation of the chuck CH is not started yet (see FIG. 7A), so that an external force on the workpiece W includes only a reaction force F at the corner portions (or edge portions in some cases). (The gravity is not mentioned herein.) As mentioned before with reference to FIG. 3B, the instruction point Q that is set on the chuck CH is situated on a position a little nearer to the workpiece fixing surface H of the chuck CH than the TCP even when the distal end face G of the workpiece W held in the robot hand HD is fully in contact (plane contact) with the workpiece fixing surface H. When part of the workpiece W is in contact with the workpiece fixing surface H of the chuck CH, therefore, the TCP can never coincide with the instruction point Q. As shown in FIG. 7A, the position of the TCP does not correspond to a chuck center point A (point expected to correspond to the TCP when the chucking is completed).

When the part GC of the workpiece W starts to touch the workpiece fixing surface H of the chuck CH, the force sensor 41 immediately senses a force (six-axis force) that is derived from the reaction force F, and transmits a signal indicative of the contact to the robot controller RC. On the other hand, the host CPU 10 repeats a process for loading the RAM 12 with the up-to-date output of the force sensor 41 with every processing cycle.

When the part GC of the workpiece W is in contact with the workpiece fixing surface H of the chuck CH, therefore, the force sensor 41 senses this (determination in Step S3 is YES), and adjusts the position loop gain and the speed loop gain to values $K_{p\text{-}float}$ and $K_{v\text{-}float}$, respectively, the values at the time when soft-floating is effective. The contents of processing in Step S4 in the first processing cycle for the detection of the aforesaid contact by the force sensor 41 include modifications of the position loop gain and the speed loop gain into the values $K_{p\text{-}float}$ and $K_{v\text{-}float}$, respectively, the values at the time when soft-floating is effective. The contents of processing in Step S4 in the next and subsequent processing cycles include processes for keeping the position loop gain and the speed loop gain at $K_{p\text{-}float}$ and $K_{v\text{-}float}$, respectively.

After the soft-floating function is effectuated with the position loop gain and the speed loop gain adjusted to $K_{p\text{-}flat}$ and $K_{p\text{-}float}$, respectively, as described above, it is determined whether or not a closing signal for the chuck CH is outputted (Step S5). If the closing operation is not started by the chuck CH yet, the signal for closing of the chuck CH is outputted (Step S6).

In the state where the part GC of the workpiece W is in contact with the workpiece fixing surface H of the chuck CH so that the soft-floating function is effectuated (see FIG. 6), the workpiece W (and hence the robot hand HD) receives the external force F as it is subjected to the attitude correcting motion, as indicated by arrow R in FIG. 6.

While the robot hand HD is executing the attitude correcting motion, whether closing of the chuck CH is completed or not is checked (Step S7). When closing of the chuck is not completed, the present processing cycle is finished, and then the processing returns to the first step (Step S1). It is supposed here that part of the workpiece W never leaves the workpiece fixing surface H once it touches the workpiece fixing surface H. Even if part of the workpiece W is in contact with the workpiece fixing surface H of the chuck CH, the processes of Steps S1, S2, S3, S4, S5, S7 and S1 are repeated when closing of the chuck is not completed yet (determination in Step S7 is NO).

When the TCP reaches the instruction point Q after the delivery of the move commands to the servo amplifiers for the individual axes is finished as the aforesaid series of processes is repeated, the processing skips Step S2 and advances from Step S1 to Step S3. Thus, when the completion of the chuck closing is not yet detected in Step S7 although the instruction point Q is reached by the TCP, the processes of Steps S1, S3, S4, S5, S7 and S1 are repeated.

The closing operation of the chuck CH is started when part of the workpiece W starts to touch the workpiece fixing surface H of the chuck CH (i.e., when the determination in Step S3 changes from NO into YES). In a short time after a signal for starting the closing operation of the chuck CH is outputted (Step S6), the corner portions or edges that are continuous with the individual side faces of the workpiece W are brought individually into contact with all (or some) of the chucking members CH1 to CH4, as shown in FIG. 7B. When the chucking members CH1 to CH4 in the state shown in FIG. 7B continue their closing operation, the movement of these chucking members CH1 to CH4 gives a turning force in the direction of arrow AR in FIG. 7B to the workpiece W that is supported by the hand HD of the robot with the soft-floating function effectuated. In consequence, the workpiece W starts the attitude correcting motion indicated by arrow AR in FIG. 7B, and finally stops in a state shown in FIG. 7C such that the upper, lower, left-hand, and right-hand side faces of the workpiece W are in plane contact with the chucking members CH1 to CH4, that is, in a chucking operation completion state. The position of the TCP in this state corresponds to the chuck center point A.

In some cases, the distal end face of the workpiece W may not be intimately in contact with the workpiece fixing surface H of the chuck CH even when the chucking operation completion state is detected (Step S7). In such cases, the convergence of the robot movement is not detected (Step S8), so that the processing returns to the first step (Step S1). Thereupon, the processes of Steps S1, (S2), S3, S4, S5, S7, S8 and S1 are repeated. As this is done, the distal end face G of the workpiece W comes intimately into contact with the workpiece fixing surface H of the chuck CH in Step S8, as shown in FIG. 3B. If it is found that the actual speeds of the individual axes of the robot are reduced substantially to zero, a signal is outputted to clear position deviations and speed deviations in servo systems for the individual axes to "0" (Step S9), and an opening signal for the hand HD is then outputted to open the hand HD so that the workpiece W is disengaged from the hand HD (Step S10), whereupon the processing terminates. Both the position and speed deviations are cleared in Step S9 in order to prevent the robot from moving as the hand HD is opened.

Although not supposed in connection with the above description, in the case where the workpiece comes into contact with an obstacle before it touches the workpiece fixing surface H, the soft-floating function is effectuated until the contact is canceled, too, and the robot substantially rubs the obstacle as it advances and can return to its original track that leads to the instruction point Q in a short time. But, to cope with the contact with such a obstacle, it is advisable to attach a condition to the position of the TCP for the outputting of the signal for closing of the chuck at Step 6.

In the case described above, moreover, the force sensor output is used for the contact detection in Step S3. As mentioned before, however, there are various known methods of contact detection, including the utilization of various other sensors than the force sensor or a disturbance observer, and any of these well-known means may be used without any hindrance at all.

We claim:

1. A robot control method comprising:

detecting contact between a robot or an object supported by said robot and an external object during operation for the movement of said robot, individual axes of said robot being driven by servomotors controlled by a control system including a position control loop and a speed control loop;

adjusting the respective gains of said position control loop and speed control loop downward in response to detecting said contact; and applying an external force to said robot which is controlled with the respective gains of said position control loop and speed control loop adjusted downward, after said contact, so that a position and attitude of said robot are converged.

2. A robot control method according to claim 1, wherein said external force includes a reaction force produced by a contact with the external object generated as said robot moves.

3. A robot control method according to claim 1, wherein said external force includes an external force applied by a device outside said robot.

4. A robot control method comprising:

moving a robot, which holds a workpiece in a hand thereof, along a programmed path in accordance with a move command from a robot controller;

lowering a value of a loop gain of a control system for the robot in response to detecting contact between a part of said workpiece and a part of a chuck to be loaded with said workpiece;

subjecting said workpiece to an attitude correcting motion by a force produced by said contact between the part of the chuck and the workpiece; and causing said chuck to start to be loaded with said workpiece and further subjecting said workpiece to an attitude correcting motion by a force of the part of the chuck on the workpiece produced by the loading operation, thereby leading the workpiece into a chucking completion state, wherein the force applied to said robot, which is controlled with the loop gain lowered after said contact, causes a position and attitude of said robot to be converged.

5. A robot control system comprising:

a robot controller for controlling a robot;

contact detecting means for detecting contact between said robot or an object supported by said robot and an external object, said contact detecting means being connected to or provided in the robot controller;

gain modifying means for modifying a loop gain of said robot in in response to said contact detecting means detecting contact; and means for applying an external force to said robot which is controlled with the loop gain modified after said contact, so that a position and attitude of said robot are converged.

6. A robot control system according to claim 5, further comprising manual input means connected to said robot controller, said manual input means including a display screen for setting the value of the loop gain to be modified by said gain modifying means at a desired value or for selecting an optimum menu among some prepared menus.

* * * * *

UNITED STATES PATENT AND TRADEMARK OFFICE
CERTIFICATE OF CORRECTION

PATENT NO.:    6,140,788
DATED      :   October 31, 2000
INVENTOR(S):   Atsushi WATANABE, et al.

It is certified that errors appear in the above-identified patent and that said Letters Patent is hereby corrected as shown below:

Column 7,
    line 30, change "flat" to --float--.

Column 10,
    line 8, delete "in" (second occurrence).

Signed and Sealed this

First Day of May, 2001

*Attest:*

NICHOLAS P. GODICI

*Attesting Officer*    *Acting Director of the United States Patent and Trademark Office*

UNITED STATES PATENT AND TRADEMARK OFFICE
CERTIFICATE OF CORRECTION

PATENT NO.:     6,140,788
DATED      :    October 31, 2000
INVENTOR(S):    Atsushi WATANABE, et al.

It is certified that errors appear in the above-identified patent and that said Letters Patent is hereby corrected as shown below:

ON THE TITLE PAGE

Item
[54]   Please correct the title to read --CONTROL METHOD AND A CONTROL SYSTEM FOR A ROBOT--.

[75]   after "Atsushi Watanabe, change "Minamitsuru-gun" to --Minamitsuru--; and after "Tsuchida," change "Oshino-mura" to Minamitsuru--.

Column 1,
   lines 1 and 2, delete these lines in their entirety, and replace with --CONTROL METHOD AND A CONTROL SYSTEM FOR A ROBOT--.

Signed and Sealed this

Eighth Day of May, 2001

Attest:

NICHOLAS P. GODICI

Attesting Officer   Acting Director of the United States Patent and Trademark Office